United States Patent
Kane

(10) Patent No.: US 11,212,277 B1
(45) Date of Patent: Dec. 28, 2021

(54) SYSTEM AND METHOD FOR SECURING, PERFECTING AND ACCELERATING BIOMETRIC IDENTIFICATION VIA HOLOGRAPHIC ENVIRONMENTAL DATA

(71) Applicant: KNWN TECHNOLOGIES, INC., Boca Raton, FL (US)

(72) Inventor: Richard Lawrence Kane, Boca Raton, FL (US)

(73) Assignee: KNWN TECHNOLOGIES, INC., Boca Raton, FL (US)

( * ) Notice: Subject to any disclaimer, the term of this patent is extended or adjusted under 35 U.S.C. 154(b) by 210 days.

(21) Appl. No.: 16/458,509

(22) Filed: Jul. 1, 2019

Related U.S. Application Data

(60) Provisional application No. 62/763,762, filed on Jul. 2, 2018.

(51) Int. Cl.
*H04L 29/06* (2006.01)
*G06K 9/00* (2006.01)
(Continued)

(52) U.S. Cl.
CPC ...... *H04L 63/0861* (2013.01); *G06K 9/00892* (2013.01); *H04L 43/045* (2013.01); *H04L 67/2847* (2013.01); *H04L 67/12* (2013.01)

(58) Field of Classification Search
CPC .............. H04L 63/0861; H04L 63/107; G06K 9/00892; G06Q 20/40145; H04W 28/0268;
(Continued)

(56) References Cited

U.S. PATENT DOCUMENTS 7,757,095 B2 * 7/2010 Tsukagoshi .......... G03H 1/2286
713/186
10,200,364 B1 * 2/2019 Ketharaju ............. H04W 12/66
(Continued)

FOREIGN PATENT DOCUMENTS

CN 110752976 A * 2/2020
EP 2959641 A2 * 12/2015 .............. H04W 4/70
(Continued)

OTHER PUBLICATIONS

English, "How Close Are We to Real 3D Holographic Technology", 2020 (Year: 2020).*
(Continued)

*Primary Examiner* — Ondrej C Vostal
(74) *Attorney, Agent, or Firm* — Daniel S. Polley, P.A.

(57) ABSTRACT

An electronic platform/system and method that uses electronic data to protect itself by realizing where an individual's device is and where it is being accessed from. As the internet expands into the physical world, with every device being IP enabled and addressable, the geographic proximity, network proximity, proximity to the access point of the internet, the authentication, encryption and presentation and flow of data can be linked to an increasingly addressable and measurable physical reality, a moment in time and a proximity to other data and objects using the system and method. The data itself is IP accessible in the form of IP addressable storage devices, and subject to the same techniques. Geographic, chronological and addressable interrelationship of the data as it is packetized and distributed, and the devices as they communicate, form a fabric. In total, a holographic layer of authorization, encryption, and distribution of data can be created by spanning the fabric of IP addressable objects and data. As the number of types of these devices proliferate, it becomes geometrically more complex to replicate the local fabric. A unique encryption key, access
(Continued)

MASTER FLOW CHART method, authentication method, and data distribution framework is disclosed. This unique key can further be utilized to subset biometric identification such that the number of biometric signatures to be compared may be minimized, potentially down to one, thereby geometrically speeding up biometric identification while perfecting its security.

17 Claims, 7 Drawing Sheets

(51) Int. Cl.
  *H04L 12/26* (2006.01)
  *H04L 29/08* (2006.01)
(58) Field of Classification Search
  CPC ..... G06T 17/00; G06F 3/0482; G06F 21/123; G06F 2221/2111
  See application file for complete search history.

(56) References Cited

U.S. PATENT DOCUMENTS

| | | | |
|---|---|---|---|
| 10,505,924 B1* | 12/2019 | Barakat | H04L 63/083 |
| 10,740,751 B1* | 8/2020 | Doss | G06Q 20/40145 |
| 2004/0066273 A1* | 4/2004 | Cortina | G06K 7/10366 |
| | | | 340/5.1 |
| 2005/0187934 A1* | 8/2005 | Motsinger | H04L 63/107 |
| 2012/0123786 A1* | 5/2012 | Valin | G06Q 20/1085 |
| | | | 704/273 |
| 2013/0083018 A1* | 4/2013 | Geisner | G06F 3/011 |
| | | | 345/420 |
| 2014/0279387 A1* | 9/2014 | Shifman | G06Q 40/025 |
| | | | 705/38 |
| 2015/0237046 A1* | 8/2015 | Chang | H04L 63/0861 |
| | | | 726/7 |
| 2015/0244747 A1* | 8/2015 | Wickenkamp | G06F 3/0482 |
| | | | 726/28 |
| 2015/0254446 A1* | 9/2015 | LaCous | G06K 9/00993 |
| | | | 726/19 |
| 2015/0281252 A1* | 10/2015 | Melcher | G06Q 30/0633 |
| | | | 726/4 |
| 2015/0312041 A1* | 10/2015 | Choi | H04L 63/0823 |
| | | | 713/175 |
| 2015/0327052 A1* | 11/2015 | Ghai | H04W 12/06 |
| | | | 370/328 |
| 2016/0080378 A1* | 3/2016 | VanBlon | H04W 64/003 |
| | | | 455/410 |
| 2016/0188860 A1* | 6/2016 | Lee | G06K 9/00912 |
| | | | 726/18 |
| 2016/0210621 A1* | 7/2016 | Khan | G06Q 20/409 |
| 2016/0283699 A1* | 9/2016 | Levin | G06F 21/44 |
| 2017/0272972 A1* | 9/2017 | Egner | H04W 28/0268 |
| 2017/0295173 A1* | 10/2017 | Walsh | H04L 63/0853 |
| 2018/0061127 A1* | 3/2018 | Gullicksen | G06F 3/0383 |
| 2018/0082304 A1* | 3/2018 | Summerlin | G06N 3/08 |
| 2018/0136815 A1* | 5/2018 | Tomizuka | G06F 3/04815 |
| 2018/0144557 A1* | 5/2018 | Seo | H04L 51/04 |
| 2018/0181735 A1* | 6/2018 | Yang | G06F 21/36 |
| 2018/0232718 A1* | 8/2018 | Brown | G06Q 20/227 |
| 2018/0232937 A1* | 8/2018 | Moyer | A63F 13/65 |
| 2018/0241577 A1* | 8/2018 | D'Souza | H04L 12/06 |
| 2018/0300526 A1* | 10/2018 | Cho | G06F 3/0412 |
| 2018/0302403 A1* | 10/2018 | Souders | H04L 63/107 |
| 2018/0309775 A1* | 10/2018 | Zou | H04L 63/1416 |
| 2018/0367542 A1* | 12/2018 | Wolf | H04L 63/08 |
| 2019/0080097 A1* | 3/2019 | Hardee | G06F 21/74 |
| 2019/0260741 A1* | 8/2019 | Ashok | H04L 43/0888 |
| 2019/0260742 A1 | 8/2019 | Arura | |
| 2019/0349261 A1* | 11/2019 | Smith | H04L 67/10 |
| 2019/0349769 A1* | 11/2019 | Palin | A61B 5/0022 |
| 2020/0120090 A1* | 4/2020 | Li | G06F 21/32 |
| 2021/0075618 A1* | 3/2021 | Stephenson | H04L 63/0846 |
| 2021/0112427 A1* | 4/2021 | Shveki | G06T 19/006 |

FOREIGN PATENT DOCUMENTS

| | | | | |
|---|---|---|---|---|
| EP | 3522478 A1 * | 8/2019 | | H04W 12/63 |
| EP | 3563596 A1 * | 11/2019 | | H04L 41/5054 |
| EP | 3609119 B1 * | 9/2020 | | H04L 63/0846 |
| KR | 20190107613 A * | 9/2019 | | G06K 9/00288 |
| WO | WO-2014131021 A2 * | 8/2014 | | H04L 67/16 |
| WO | WO-2021050478 A1 * | 3/2021 | | H04L 9/3226 |
| WO | WO-2021076748 A1 * | 4/2021 | | G06T 19/006 |

OTHER PUBLICATIONS

Merriam-Webster, "hologram", 2021 (Year: 2021).*
Jo et al., "Holographic deep learning for rapid optical screening of anthrax spores", 2017 (Year: 2017).*
Merriam-Webster, "holographic", 2021 (Year: 2021).*
Wikipedia, "Holographic display", 2021 (Year: 2021).*

* cited by examiner

Figure: 2

| Address A | Address B | Packe |
|---|---|---|
| | | |
| 2601:3:3880:8c00:84ae:2c24:ae78:e806 | 2a01:111:f400:3000::2 | |
| fe80::4694:fcff:fe32:3313 | ff02::1 | |
| 2601:3:3880:8c00:84ae:2c24:ae78:e806 | 2607:f8b0:4008:808::200e | |
| 2601:3:3880:8c00:84ae:2c24:ae78:e806 | 2607:f8b0:4002:c07::5f | |
| 2601:3:3880:8c00:84ae:2c24:ae78:e806 | 2607:f8b0:4008:808::200a | |
| 2601:3:3880:8c00:84ae:2c24:ae78:e806 | 2607:f8b0:4008:808::2003 | |
| 2601:3:3880:8c00:84ae:2c24:ae78:e806 | 2607:f8b0:4002:801::1012 | |
| 2601:3:3880:8c00:84ae:2c24:ae78:e806 | 2607:f8b0:4008:804::2008 | |
| 2601:3:3880:8c00:84ae:2c24:ae78:e806 | 2607:f8b0:4002:c03::88 | |
| 2601:3:3880:8c00:84ae:2c24:ae78:e806 | 2607:f8b0:4002:c08::6d | |
| fe80::ffff:ffff:fffe | ff02::2 | |
| fe80::ffff:ffff:fffe | fe80::8000:f227:62c7:6f28 | |
| fe80::523d:e5ff:fe0b:dae2 | ff02::d | |
| 2001:558:40c0:92::1 | ff02::1 | |
| 2001:558:feed::1 | 2601:3:3880:8c00:84ae:2c24:ae78:e806 | |
| 2001:558:feed::2 | 2601:3:3880:8c00:84ae:2c24:ae78:e806 | |
| 2601:3:3880:8c00:84ae:2c24:ae78:e806 | 2a01:111:f004:21::137 | |
| fe80::e4ae:c349:25a1:f35e | ff02::16 | |
| fe80::4694:fcff:fe32:3313 | fe80::e4ae:c349:25a1:f35e | |
| fe80::cad7:19ff:fef9:6f8e | ff02::16 | |
| fe80::290:a9ff:fe3c:d015 | ff02::16 | |
| 2601:3:3880:8c00:84ae:2c24:ae78:e806 | 2606:2800:11f:179a:1972:2405:35b:459 | |

Figure: 3

| | | | | |
|---|---|---|---|---|
| Utilization | Speed | | Maximum speed: | 2.10 GHz |
| 4% | 2.10 GHz | | Sockets: | 2 |
| | | | Cores: | 16 |
| Processes | Threads | Handles | Logical processors: | 32 |
| 108 | 2783 | 128259 | Virtualization: | Enabled |
| | | | L1 cache: | 1.0 MB |
| Up time | | | L2 cache: | 16.0 MB |
| 29:18:21:09 | | | L3 cache: | 22.0 MB |

FIGURE 7 - MASTER FLOW CHART

SYSTEM AND METHOD FOR SECURING, PERFECTING AND ACCELERATING BIOMETRIC IDENTIFICATION VIA HOLOGRAPHIC ENVIRONMENTAL DATA

This application claims the benefit of and priority to U.S. Application Ser. No. 62/763,762, filed Jul. 2, 2018, which application is incorporated by reference in its entirety for all purposes.

FIELD OF THE INVENTION

The disclosure relates generally to identity authentications and more particularly to decreasing the processing time for electronic identity authentication.

BACKGROUND

Current solutions for protecting a person's identity and personal data are outdated and leave businesses and consumers vulnerable to theft, hacks and fraud. For example, usernames and passwords are easy to forget and steal. Currently solutions are lacking for the continuous authentication and protection of identities after a person a has signed up for a service. Today's biometric solutions have limited use and are typically tethered to a specific device or stored in a centralized database. The existing market solutions do not adapt with people's physical changes, nor with environmental changes. As companies are currently relying solely on biometrics as the only factor of authentication, the customer is left exposed to spoofing. The escalating crisis in payments, privacy and security cost businesses and consumers billions of dollars annually.

The requirement for Strong Customer Authentication ("SCA") for payment services and payment service providers is becoming more prevalent. In order to satisfy SCA requirements, at least two of the following three elements for electronic payments must be present: something only the customer has, something only the customer knows and something only the customer is. Other new standards for electronic payments are being introducing which use or will authentication through a wider range of data, biometric authentication and an improved online experience. Thus, biometrics are being the new standard for digital identify and payments.

One form of biometric identification relies on the comparison of a digitized image to a universe of digital images. This is rate limited and computationally expensive when comparing one-to-many. The best voice comparisons for example can compare 6000 voice prints per second. Traditional biometrics have been utilized for access—comparing an individual to the expected individual (an employee at an office being secured, the owner of a phone), etc.

The disclosed novel system and method is directed to reducing and balancing the above identity/authentication issues concerning privacy, security and access and addresses the need in the field through a novel and effective approach of using a subset of the number of potential matches to be compared.

SUMMARY OF THE DISCLOSURE

Generally disclosed in a novel system/platform and method for delivering end-to-end, continuous, multi-factor digital identity authentication, preferably in real-time, through any camera-enabled electronic device. Using the disclosed unbundled application programming interface ("API") allows a software developer or other user to add intelligent device and biometric identity authentication capabilities to their applications, thus, providing their customers with a private and secure, portable digital identity.

The disclosed novel API can be a platform which can use artificial intelligence ("AI")-driven face authentication and Internet of Things ("IoT") technologies. The disclosed and described novel platform allows people and companies to digitally interact with one another, seamlessly and without friction, thus allowing an individual to access desired goods, services, information and experiences with the level of privacy and security required. Using the disclosed platform, a people can have a quantum identity, where they can digitally exist anywhere and nowhere at the same time, in order to solidify trust on both side of a transaction.

Some non-limiting features, benefits, advantageous and/or characteristics of the disclosed method and platform, can include:
1. Can preferably use three factor authentication;
2. Can be device-neutral;
3. Can have zero-knowledge capability;
4. Can provide intelligent, tokenized, distributed and fragmented data management in proprietary enterprise blockchain;
5. 1:N cloud-based biometric authentication and retrieval in preferably $\frac{1}{8}^{th}$ of a second of time.

The novel platform provided for an evolving user identity using IoT, AI and biometrics to provide for continuous, self-learning biometric identity authentication. In one non-limiting example, facial recognition can be used for the biometrics component. With the facial recognition, AI and IoT technologies, the novel platform provides and enables continuous protection and authentication with privacy and security for every identity transaction. Thus, the novel platform is preferably intelligent and can evolve with the user at every interaction and thus evolves and recognizes any physical or environmental changes for the user.

The Iot Authentication takes advantage of the billions of connected electronic devices and sensors in the world, with each device and sensor having its own unique ID and communication pattern. Thus, the disclosed novel platform, does not only rely on the user's phone for their identity, but only as a part of the user's identity, along with other electronic devices of the user, such as, without limitation, smart watch, Bluetooth headset, Bluetooth ear buds, table, laptop, etc. Each of these additional electronic devices also provide a factor of authentication to prove that the user is who they say they are. Thus, the more devices belonging to the user and connected via the IoT, the stronger the authentication of the user and the more powerful the disclosed novel platform becomes. The disclosed novel system/platform and method also can establish the pattern of exposure to other IoT devices, identifying patterns of behavior and travel that link a person to their travel habits.

Accordingly, the novel platform provides for identify layer that can be built around the user's electronic device(s), and the unique combination of such devices can create a digital fingerprint everywhere they go and can be more accurate and less intrusive than geo-fencing. The platform provides for passive, fast and accurate authentication (i.e. preferably about $\frac{1}{8}^{th}$ of second) and retrieval of the user's data, including biometric, by preferably pushing or prefetching biometric data for the individual to an anticipated location that the system/platform determines that the individual will be visit (physically or virtually), based on patterns and routines and other information/data the system has received from the various connected IoT devices that are associated with the individual. During authentication any Bluetooth and Mac IP addresses can be obfuscated and data packets are preferably never opened and inspected, in order to maintain the user's privacy. Using the novel platform technology, a user can transact online and offline regardless of whether they currently posses their working smartphone on them.

For purposes of authentication each person's face is unique and ever evolving. Unlike prior biometric facial recognition solutions that use static data points, the disclosed platform uses the person's whole face view preferably via high-resolution images and continues to capture and learn about such person's face characteristics with every interaction therewith. The high-resolution images can be broken down by pixels to train the platforms neural network on a more robust (as compared to prior techniques) set of characteristics from onboarding the information/data through every interaction with the person. Preferably, though not limiting, the platform/system can manage up to five hundred (500) images of a particular person to perfect the system/platform on such person and allow for evolvement of the person's physical and environmental changes over time. Preferably, the platform removes or does not involve any racial or gender bias. The platform also eliminates the need for storage of biometric keys and data. The platform is able to transact with or on any camera-enable device. And removes any requirement that the biometric data be tethered to a specific device.

With its second and/or third factor of authentication with the platform for validating a person's digital identify, the platform can preferably use a four-digit PIN having at least 10,000 combination or a six-digit PIN having at least one million possible combinations. Other number of PIN digits can also be used and are considered within the scope of the disclosure, with the more digits provided, the more possible combinations and being harder to "crack". The PIN can be a manual entry for a holistic three-factor authentication solution. The PIN can confirm and further perfect the biometric authentication when no personal device (IoT authentication) is present. In one non-limiting use, the PIN can be used in combination with the other two factors of authentication to reduce risk for high-value transactions.

Thus, the disclosed novel platform/system can utilize artificial intelligence within every layer of its technology stack. The platform evolves with each user on every interaction it is involved with, making the platform faster, more secure and accurate with every use. The platform preferably does not use or require any special or custom hardware and can be deployed and used across any camera-enabled device, which allows for portable biometrics and identity. The platform preferably does not store all of the user date in a centralized database. Rather, the user date can be preferably wrapped in intelligent code, distributed, parsed and managed similar to blockchain technologies. Thus, the data can be partitioned and distributed across geographies and then retrieved and reassembled when needed.

The system builds an identity and security layers around a user's electronic devices and the communication with the devices around them. The platform allows for passive, fast and accurate authentication (i.e. preferably $1/8^{th}$ of a second) and retrieval of the user's data, such as, but not limited to, biometrical data, so that it is readily available for use in authenticating/identifying the individual in connection with a transaction or other activity. As the biometric data has been prefetched (already gathered and available), the time needed for authenticating is reduced. The system/platform used information/data it has receive from the IoT devices associated with the individual and uses such information/data to anticipate or predict where the individual will be in the future (physical and/or virtually) and provides the biometric data for the individual at the anticipated location preferably prior to it being needed for authenticating the individual.

The platforms preferred unbundled APIs can be designed to provide a digitally driven business the ability to quickly and seamlessly integrate the platform into their existing software applications. As non-limiting examples, the unbundled components can be used as REST APIs with JSON and SOAP APIs with XML, thus, making for easy/ seamless integration to and deployment with any existing platform, such as, but not limited to, Web based operating systems, Apple IOS, Android, etc. As mentioned above, the novel platform and method described herein can be used on any camera-enabled mobile device, including, without limitation, smartphones, tablets, laptops, etc.

The platforms uses device communication to build a layer of authorization and encryption around a user's identify data and allows for accelerated and more accurate biometric authentication and retrieval in a one-to-many search as compared to current technologies. As mentioned above, facial recognition and AI can be used to evolve with the platform users during every interaction and the system/ platform teaches itself with the introduction of new technologies.

Preferably, the platform using self-learning decision engines for behavioral risk analysis of customers provides for three-factor authentication using IoT, facial recognition and unique PIN codes which evidence what the person has, who they are and what they know. The disclosed novel platform/system can be device neutral (portable biometrics), can provide for end-to-end, continuous authentication, can provide for liveness/spoof detection, can use adaptive biometrics; can use IoT identity and Security layer; can provide for multi-factor authentication, can be unbundled APIs and SDKs; can operate at great (relative) speed and a great (relative) accuracy (low false acceptance rate).

Some non-limiting uses for the novel platform/method includes in connection with authentication card-not-present transactions, mobile and internet banking access, electronic payment authentication, know your customer ("KYC") solutions, peer-2-peer payment authentication, etc. Accordingly, the disclosed novel platform/system and methods provide for speeding and securing the biometric identification of an individual among hundreds of millions of biometric signatures.

BRIEF DESCRIPTION OF THE DRAWINGS

FIG. 2 is a screenshot of actual non-limiting conversation being captured and analyzed by the program to ascertain the environment it is running in in accordance with the disclosed novel platform/system and method;

FIG. 3 is a screenshot illustrating the A and B locations for each conversation being analyzed in accordance with the disclosed novel platform/system and method;

DETAILED DESCRIPTION

The platform/system and methods described herein provides for using additional markers preferably recorded/captured during the user registration process and on additional uses of the platform/system (i.e. to capture any physical or environment changes for the user)—that will a) limit the number of matches to be performed thereby speeding up biometric identification and b) cross check the biometric identification with IoT cloud verification. Thus, the user can be identified by his or her biometrics plus their wearables plus any signatures at their location. This creates an 'Authentication of Everything'

Figure 1:
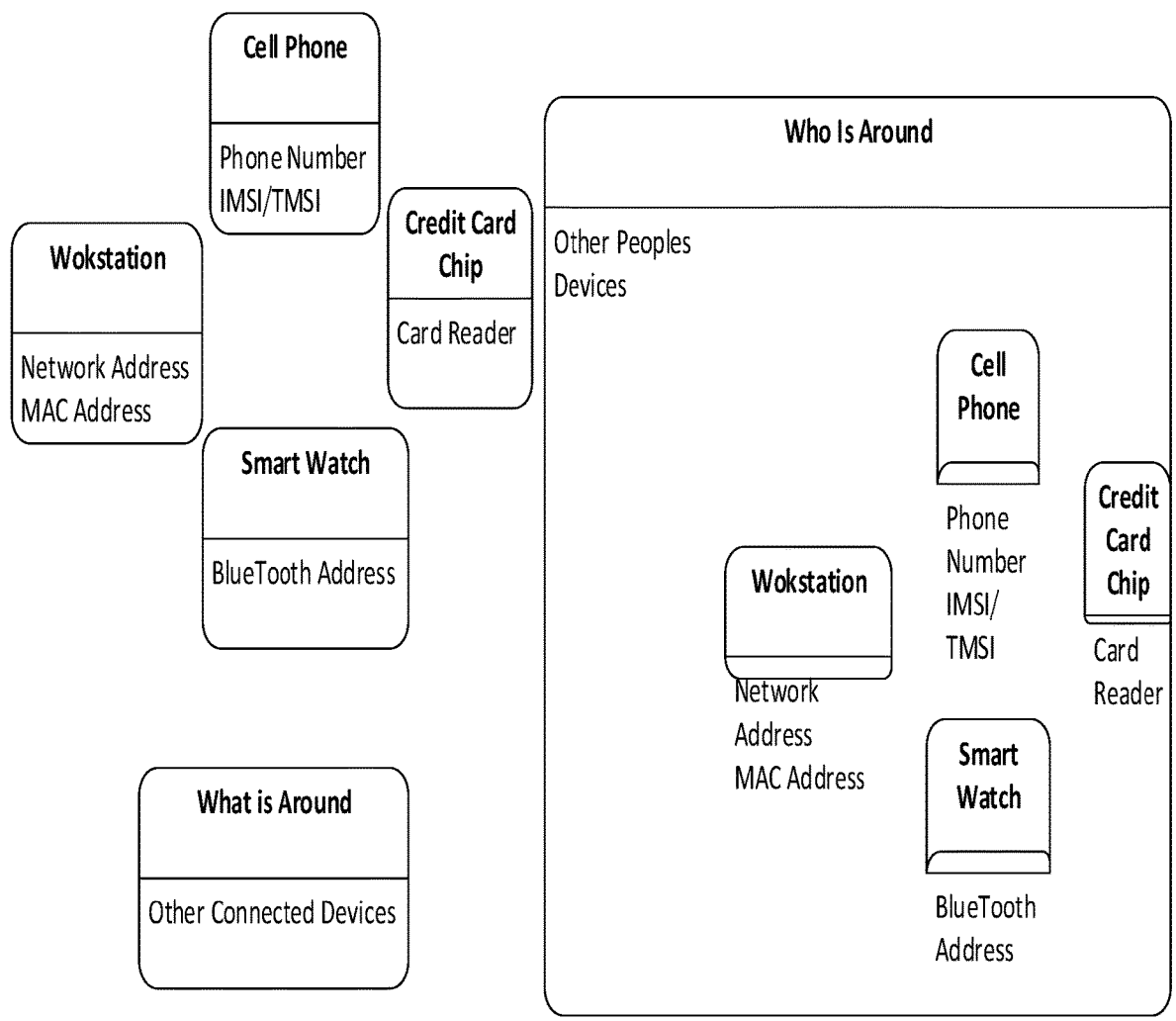
FIG. 1 is a block diagram of a non-limiting scenario of various connected devices in an immediate vicinity of individual's device in accordance with the disclosed novel platform/system and method.

The platform/system and methods provide for delivering end-to-end, continuous, multi-factor digital identity authentication, preferably in real-time, through any camera-enabled electronic device. FIG. 1 illustrates a preferred, though non-limiting, computer architecture for the platform/system. With respect to speed, the client transactions, In Memory Dictionary and Task Scheduling (MSGQ—message cue—task management work queue) are preferably the highest. The In Memory Caches and Data Exchange API areas are intermediate and the SQL Server, Compliance, Reporting, Record Public Blockchain, Record Local Hyperledger and Cross Chain areas the slowest and least important to core system performance. The arrows between the blocks show the direction of communication and information transfer between the various areas/components.

Figure 4:
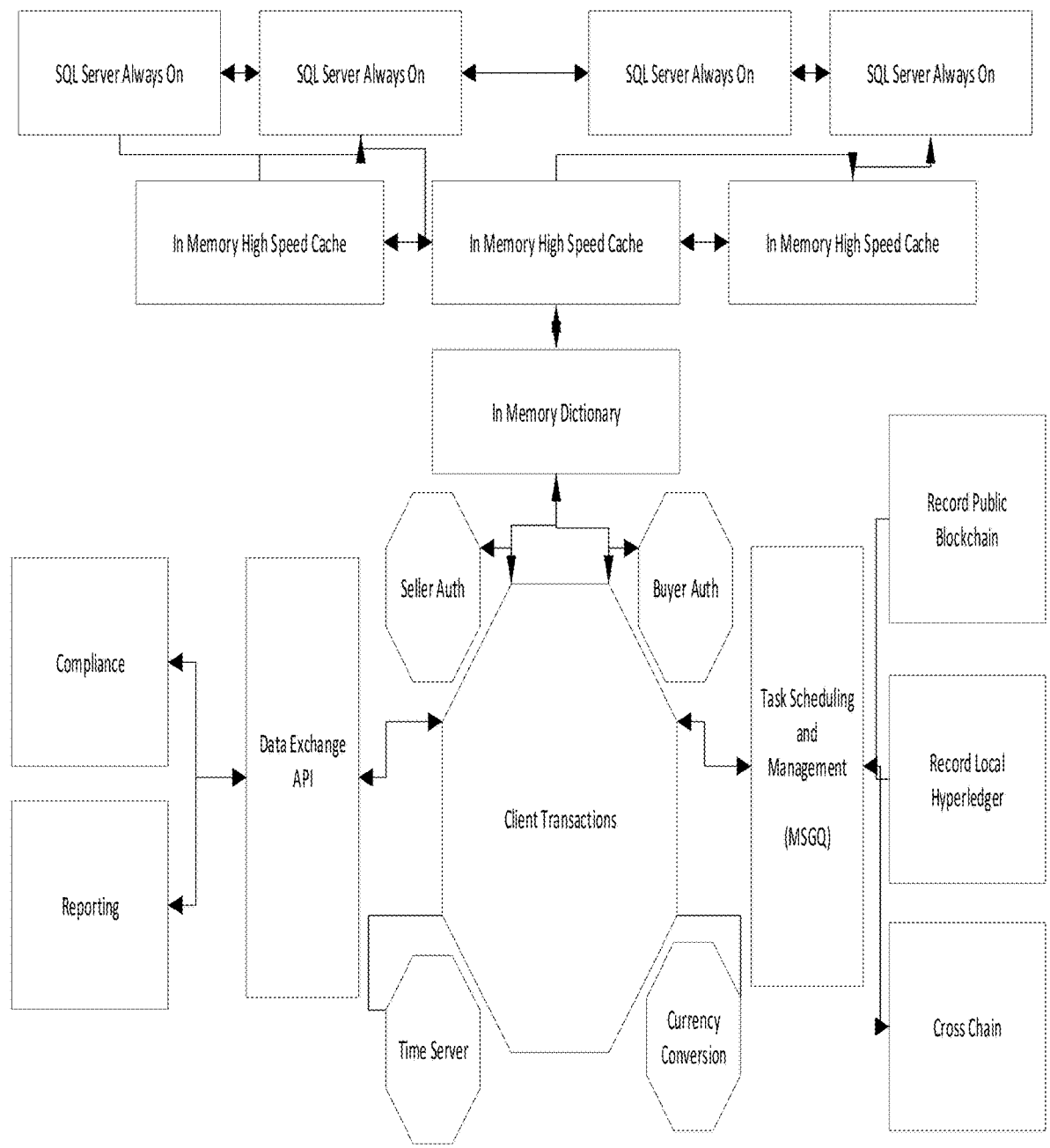
FIG. 4 illustrates a block diagram a preferred, though non-limiting, computer architecture embodiment in accordance with the disclosed novel system/platform and method.

Using FIG. 4 as a reference, the disclose system/platform engine can use three levels of distributed cache or the local processing of messaging. This allows the platform/system to retain very high-speed processing with fault tolerance and redundancy. The In-Memory Dictionary(ies) can be backed up to a N high speed REDIS cache servers (high speed in memory lookups) which are in turn can be backed up to a cluster of N SQL Server Always On machines.

Information transfer to and from the Blockchain can be via a highly secure task management msq system, preferably using Cypherkey and iDaaS (discussed in the "Intelligent Data as a Service" section) security features. This allows task processing to occur in an asynchronous yet fault tolerant manner, isolating the consumer transaction from any delays in Blockchain processing. Similarly journaling to multiple Blockchains, each operating at a different speed, is also supported by the disclosed design. The information to be reported back to Blockchain can include any compliance information required by local authorities, preferably including, without limitation, at least a pointer back to the actual trading parties, the price, location, and the execution time stamp. Encryption Key Components may also be stored here.

Figures 5, 6:
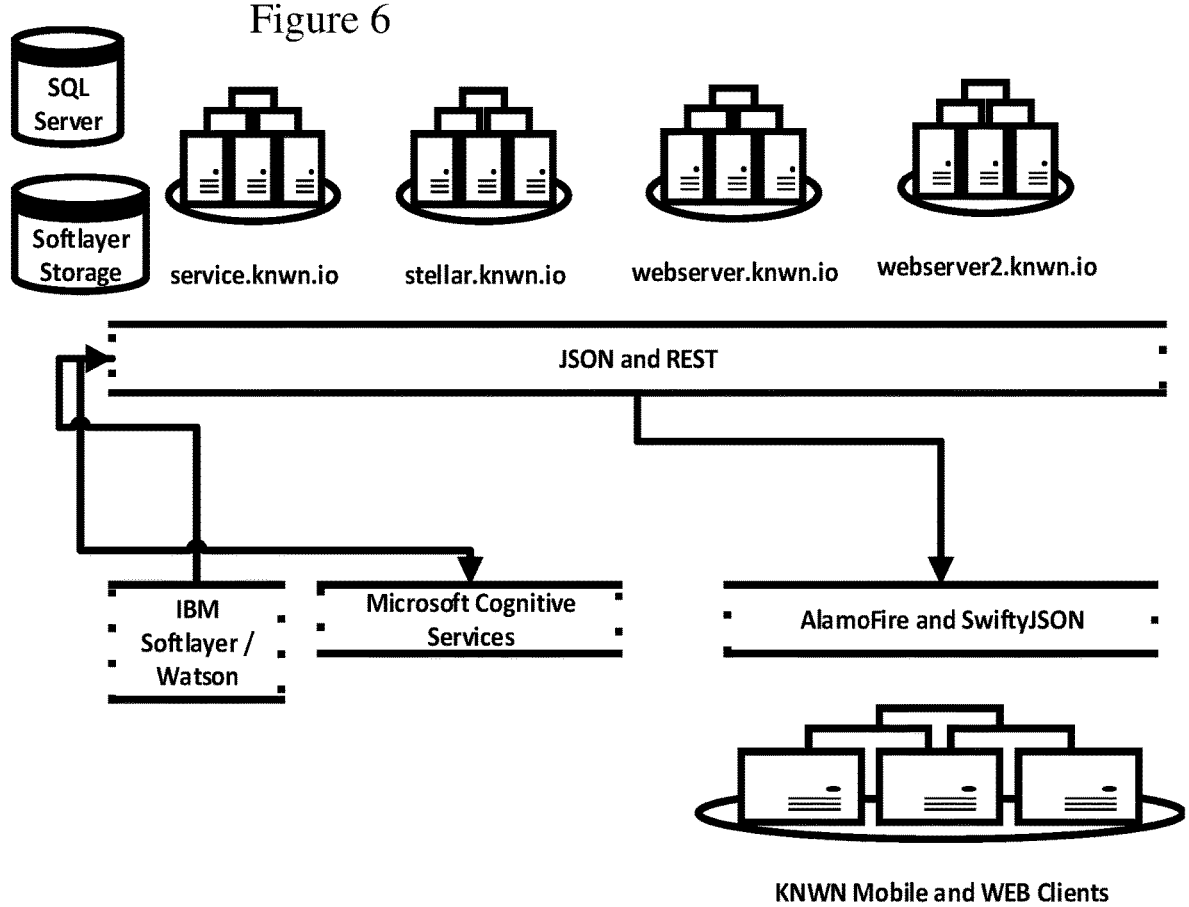
FIG. 5 is an illustration of non-limiting specification for at least one of the virtual servers that can be used in accordance with the disclosed novel system/platform and method.
FIG. 6 is a block diagram on a non-limiting embodiment of certain components (i.e. system/platform hardware architecture) used in or in connection with the disclosed novel system/platform and method.

Though not limiting, the system/platform can preferably run on a dedicated bare metal hardware preferably with a virtualized backup. In one non-limiting embodiment, the bare metal (physical) machine(s)/server(s) can be 32 core super computers that can be based around a 2.3 GHz Intel Xeon-IvyBridge EX (E7-4850-V2-DodecaCore) chip set. A non-limiting example of an hardware arrangement for the novel platform/system is shown in FIG. 6. Other hardware arrangements (metal and/or virtual) can be used and are considered within the scope of the disclosure.

In the non-limiting hardware arrangement shown in FIG. 6, a combination of metal servers and virtual servers are preferably provided. FIG. 5 shows non-limiting specs or specifications for one or more the virtual servers that can be used as part of or in connection with the disclosed platform/system. As mentioned above, preferably some of the servers used for the platform/system and method performed thereby can be virtual servers. The information shown in FIG. 5 can represent the machine utilization while running a model (i.e. 108 processes) or a hardware equipment type (i.e. suitable hardware to run a model) and can represent an example of an actual configuration used by the platform/system. Though not considered limiting, in FIG. 6, webserver2.knwn.io can be the virtualized machine/server (gear), and the other servers/machines being physical (bare metal) components.

Figure 7:
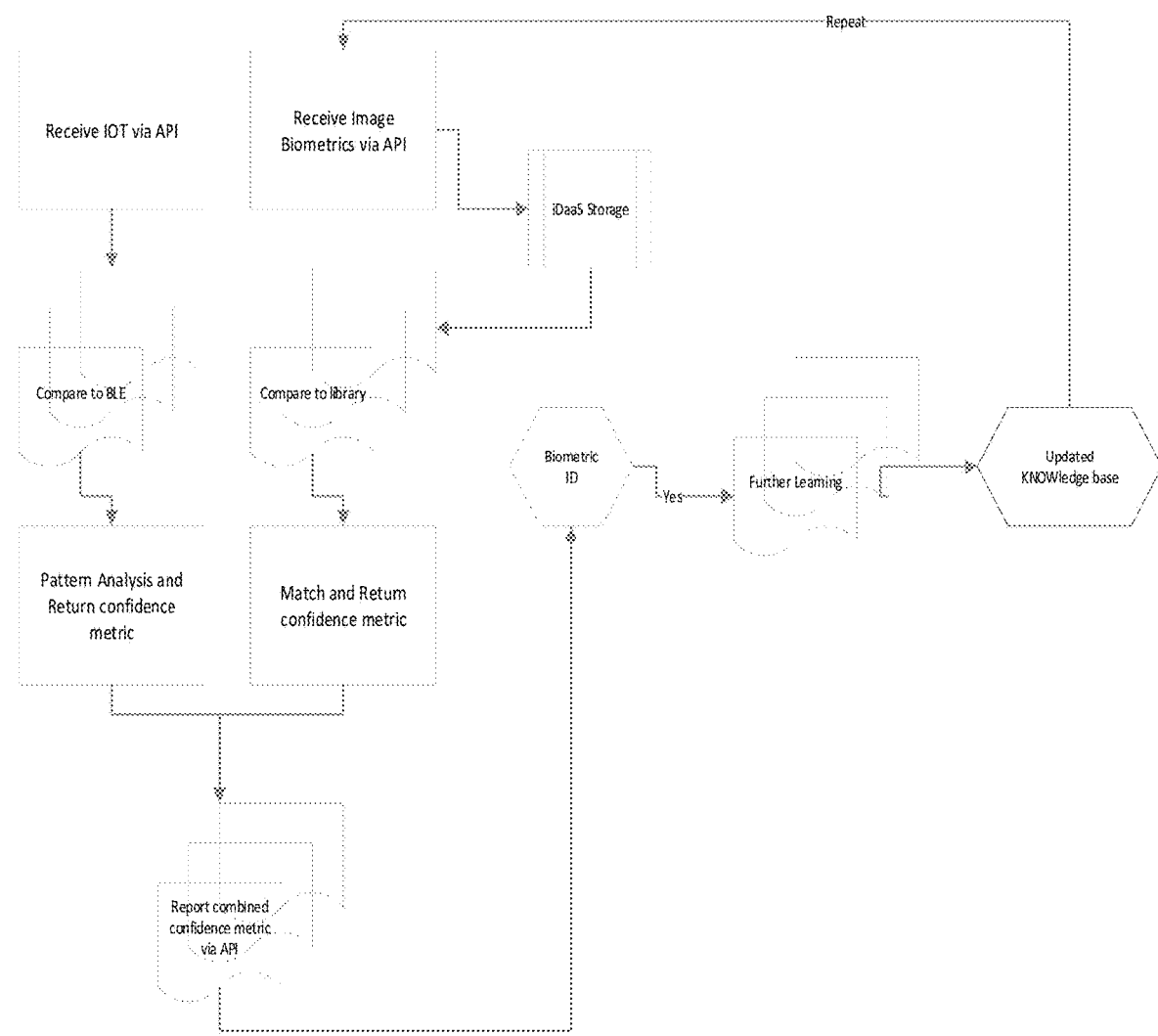
FIG. 7 is a non-limiting flow chart in accordance with the disclosed novel system/platform and method.

FIG. 7 illustrates a master flowchart for the novel platform/system and method. As seen, the platform/system can preferably receive a continual stream of IoT data and Biometric data via an API from connected devices and browsers. The IoT items (i.e. IoT data, etc.) can be sent one at a time preferably in bursts of web service hits. The biometric captures can be preferably are sent in slices. The system/platform is programmed/configured to preferably operate In parallel, to capture and correlate this data to prefect/perfect an identity match.

Though not limiting, as preferably configured/designed/programmed, the current system/architecture can sustain a rate of 100TPS for each client (batch of identities). As these can be preferably asynchronous there can be inherent parallelism. Thus, learning by the platform/system can be accomplished again asynchronously with each transaction and can end up as an afterhours/low transaction volume period.

At the Receive IOT via API block/step, each IoT device (e.g. blue tooth beacon, IP address, MAC address, etc.) that data is received from can be obfuscated at the point of capture by the mobile device, which may be necessary based on local compliance laws or other laws and regulations.

At the Compare to Bluetooth low energy ("BLE") block/step, with each BLE device (i.e. IoT devices) uploaded, the system/platform determines whether it has seen any of the BLE/IoT devices before in conjunction with the system's profile for the individual. This allows the system/platform to pre-fetch the IoT and biometric history for the individual for faster processing of the identification and/or authentication for the individual.

At the Pattern Analysis and Return Confidence Metric block/step, they system/platform is configured/programmed to electronically grab a count of the devices (i.e. IoT devices) seen in association with a particular individual's profile and how may time they have been seen prior. If no matches are found, the profile is considered to be in a new location by the system/platform. If some of the devices are known to the system/platform and preferably with high counts, they are considered closely associated with the individual's profile and are likely personal items the individual travels with or in the individual. (e.g. the BLE of their car, their headsets, smart watch, etc). The number of devices and the number of hits on each device are preferably totaled by the system/platform, parsed by a learning neural net, and a confidence level can be returned.

At the Receive Image Biometrics (or other biometric type) via API block/step, the biometric data can be uploaded to the server preferably using multipart APIs (broken into bits and sent up) and then stored by the server in iDaaS, which is considered a high speed file storage system. Other preferably high-speed electronic storage systems or databases can also be used and are considered within the scope of the disclosure.

Figure 8:
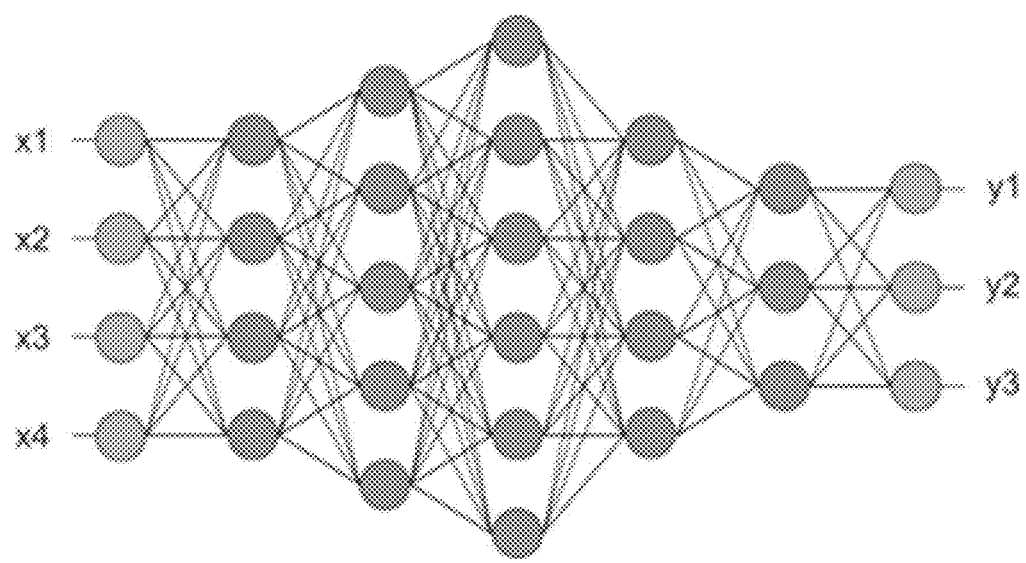
FIG. 8 is a two-dimensional diagram of a non-limiting convolutional neural network.

At the Compare to Library (i.e. rest of the individual profiles in the system/platform) block/step, a convolutional neural network ("CNN") can preferably take a biometric image and puts it thru a convolution layer, which can be the first layer to extract features from an input image. Convolution preserves the relationship between pixels by learning image features using small squares of input data. This data can then be pooled and fed to a fully connected set of layers (where the deep learning occurs) (See FIG. 8) and then can be outputted.

At the Match and Return Confidence Metric step/block, preferably the closest match against all the profiles for the system/platform with a sufficient degree of certainly can be automatically postulated by the system/platform as the match, which can be reported and include the reporting of that certainty via the API at the Report Combined Confidence Metric Via API block/step. The system/platform can be configured to combine the earlier determined/derived at IoT score (which in one non-limiting embodiment can be determined by the system/platform through the number of devices found in proximity and/or the number of found devices that were previously known to the system/platform for the individual) and the biometric score to another learning neural network and a Biometric ID is provided. From here the system/platform adds the recently submitted biometric data to the existing profile for the person and a new round of continued learning occurs. Thus, any captured physical changes and/or environmental changes for the individual are taken in account the individual's profile is updated to reflect such changes.

It should be recognized that the more information the system/platform is provided with for an individual's profile, as well as the more up-to-date such information is, will provide for a faster/better/more accurate authentication/identification of the individual associated with the profile. This results from an abundance of IoT and biometric profile data for the system/platform to learn from As seen in FIG. 1, an access request from a device or individual can be preferably tempered by items in the immediate vicinity of the individual or device as well as items on the same local network. In this way, the disclosed system/platform can preferably identify adjacent servers, human co-workers, adjacent AIs, and the network traffic fingerprints that define the location.

Figure 2:
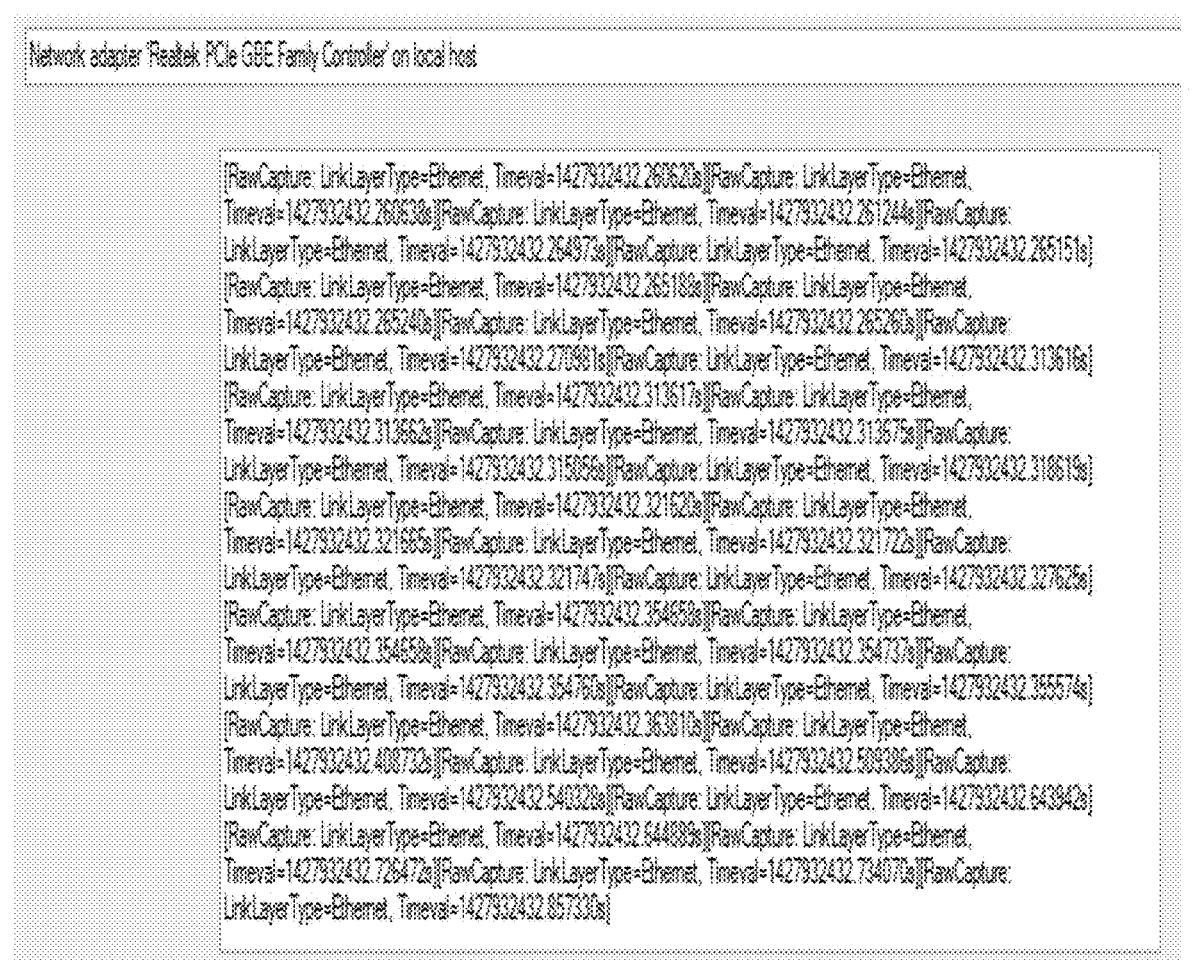

FIG. 2 represents a non-limiting example of what a digital conversation between devices being captured and analyzed by the program running on the system/platform in order for the environment it is running in to be ascertained or determined by the system/platform. As seen in FIG. 3 for each conversation being analyzed there can be an A location and a B location. The combination of conversations are preferably unique on any network at any location, based on the exponentially growing number of devices planet wide.

Individuals can create accounts/profile with the platform/system in various non-limiting ways. In a preferred embodiment, an App (application software program) is downloaded by the individual to their specific camera-enabled device, such as, but not limited to, a smartphone (collectively "Individual's Device"). Typical information can be supplied such as one or more of the following: name, email, address, phone number, etc. A one-time code is sent (i.e. SMS text message) to the phone number provided for the individual's electronic device and the code is entered on the App screen to confirm that the user's phone. Once the code has been entered, the user's camera-enabled device allows the App to capture several photographic images of the individual's face from several different angles, such as, without limitation, one or more of the following: straight on-front, turned left, turned right, positioned up—looking up; positioned down—looking down, smiling, etc. Though preferably the biometric data is an image of the individual for their particular profile with the system/platform, such is not considered limiting, and other biometric data can be also be included in addition to the images or in lieu of the images and use of such other biometric data is also considered within the scope of the disclosure. The other user contact information can be manually entered or obtained from a preferably pictured government ID (i.e. driver's license) that is also captured by the App (preferably front and back). The user's contact information taken from the ID can be verified by the user with respect to accuracy. The system/platform can also compare the captured image to the image on the ID. The user can also establish a confidential PIN for additional security. A credit card for the user can be scanned (i.e. captured) and/or entered manually. Though not limiting the expiration date and security code for the card can be entered manually. The credit card information can also be verified by the user for accuracy. Other financial payment methods for the individual can also be saved for the user's profile. Once completed, the user's profile has been established and saved with the platform/system.

In a preferred non-limiting embodiment, capturing the user's initial images can comprise taking 20 or about 20 slices of high-resolution images, which is also used for training the platform/system's neural network. During this process the system/platform can also be building the identity layer around the user's Individual Device), and communication with the devices around them, which can be used later by the platform/system to anticipate future actions by the user to allow the platform/system to prefetch the user's/individual's captured biometric data so that it is available quicker for the authentication process during the anticipated future action.

In one non-limiting embodiment, the system/platform as a payment choice for an online order. After the user selects the system/platform choice from the payment options from a point of sale terminal or other separate device, the point of sale terminal or separate device is used to capture a face biometric capture of the individual. The captured biometric is compared by the platform/system and if the user is authenticated, a payment screen appears asking the user if they wish to use their credit card on profile or another payment method. Once the user hits pay the payment is processed.

When a user/individual who has previously joined the platform/system and has a profile wants to sign in, they preferably sign in (after selecting Sign In on the screen of the App) by using their Individual Device to capture a live video of them currently. The best image/frame from the captured video is used to authenticate the user. The captured video and/or best image from the video can be preferably saved to the Individual's profile to allow the system/platform to continue to evolve and account for any physical/environmental changes to the user's appearance.

Once the user is authenticated, a summary screen can appear on the App, showing, without limitation, the user's name, the accuracy of the authentication, how many recognitions the user has and associated Bluetooth Low Energy ("BLE") devices, which can be considered the relevant metric. Thus, the platform/system is learning the holographic environmental data communicating with the user's device(s). As the application the user signs into recognizes the user's device(s), platform/system prefetches the user's information, so that it is available for use in authenticating the user quicker, which in turn results in the authenticating of the individual occurring quicker. This information regarding the BLE devices also acts as a passive first factor of authentication (i.e. "What I have") when confirming the user's identity. The user's face image (i.e. biometric) becomes the second factor.

Thus, for use with "point-of-sale" or "separate device" transactions, the platform/system provides a user with a portable identity. As discussed above, the user has the ability to make a payment on a completely separate camera enabled device without having to use their Individual Device. Thus, any data or information can be brought forward to make a transaction and the system/platform is able to perform the authentication and retrieval relatively very quickly because of the internet of things (IoT) pre fetching of the user's information in view of the platform/system recognizing that the user had his or her phone on or near them, and the system/platform recognized the communication with all the other devices around the user which created a unique digital fingerprint.

Thus, the system/platform can act as a risk prevention or cybersecurity tool, since the AI continues to learn if you've been to a location before (though not the address like geofencing), how many times, or if I've never been there before and continues to use this information in its actions, determination and anticipations of later actions by the user.

The platform/system continue to learn about NLE devices for the user and the AI works with and uses such holographic environmental data. The system/platform continues to learn and receive information regarding nearby IoT device and uses such information in in decision making.

Some uses, features and/or functions of the described system/platform and/or methods performed thereby, include, without limitation:

(a) identifies, records and analyzes the type of data flowing within each conversation;
(b) identifies, records and analyzes the type of volume of data flowing within each conversation;
(c) identifies, records and analyzes the variance of data flowing within each conversation;
(d) identifies, records and analyzes the cadence of data flowing within each conversation;
(e) identifies, records and analyzes the distance between devices;
(f) identifies, records and analyzes the location of each device;
(g) identifies the presence of one or more unique and pre-registered devices on the same network;
(h) identifies the presence of one or more unique and pre-registered programs on the same network;
(i) identifies the trace route and routing of packets on the network, creating an internal diagram of the network.
(j) identifies, records and analyzes whether mobile devices communicating on each access point are associated with the device attempting to store or access data;
(k) identifies, records and analyzes the conversations between mobile devices sniffed across each access point that are associated with the device attempting to store or access data, forming a map of interconnected devices. See FIG. 3;
(l) identifies, records and analyzes the type of data flowing between mobile devices within each conversation;
(m) identifies, records and analyzes the volume of data flowing between mobile devices within each conversation;
(n) identifies, records and analyzes the variance of data flowing between mobile devices within each conversation;
(o) identifies, records and analyzes the cadence of data flowing between mobile devices within each conversation;
(p) identifies, records and analyzes the distance between mobile devices within each conversation;
(q) identifies, records and analyzes the location of each mobile device within each conversation;
(r) identifies, records and analyzes consumer devices communicating on each access point are associated with the device attempting to store or access data;
(s) identifies, records and analyzes the conversations between consumer devices sniffed across each access point that are associated with the device attempting to store or access data, forming a map of interconnected devices. See FIG. 3;
(t) identifies, records and analyzes the type of data flowing between consumer devices within each conversation;
(u) identifies, records and analyzes the volume of data flowing between consumer devices within each conversation;
(v) identifies, records and analyzes the variance of data flowing between consumer devices within each conversation;
(w) identifies, records and analyzes the cadence of data flowing between consumer devices within each conversation;
(x) identifies, records and analyzes the distance between consumer devices within each conversation; and
(y) identifies, records and analyzes the location of each consumer device within each conversation.

The system/platform allows a pre-fetch to be performed based on the likelihood of a user/client of the system/platform presenting themselves as determined by a) the location and the behavior patterns of the client (i.e. user is usually at a specific location at a specific time of day) as well as the pre-recognized device signatures. The pre-fetch loads and assembles relevant biometric data into memory to be ready to be compared against and validated. In addition, pre-fetch and the registration design allow for multiple parallel paths of validation—one AI can check the IoT and location behaviors and signatures, a second can perform a biometric match, a third can examine the biometrics for spoofing. These all can be done in parallel and the scores are brought back together and can be merged by an umbrella AI (i.e. a system of systems approach).

The system/platform measures the interconnectedness fabric at the location attempting to store or access data—and uses that information to subset the universe of biometric signatures to be matched. As shown in FIG. 1, the measurement of this fabric can provide a comprehensive security authentication, basis for encryption, and data point for pattern analysis. Data and programming not recognizing it's surrounding as appropriate, usual, customary or valid will refuse to reassemble, de-encrypt or even be accessible.

The system/platform can identify the network access points that are associated with the device attempting to store or access data.

The system/platform can identify other devices communicating on each access point are associated with the device attempting to store or access data. The system/platform can identify the conversations between devices sniffed across each access point are associated with the device attempting to store or access data, forming a map of interconnected devices (FIG. 3)

The holographic map of this data uniquely identifies a location within the physical world, within the internet of things as well as the internet in its current evolving form. This map can be leveraged in addition to biometric, physical and password protections to authorize access. This map can be leveraged for encryption forming the basis of unique keys. This map can be leveraged to identify a specific location in time and space that could not be replicated without having all of the physical devices placed and communicating in the exact geometry as when taken.

Thus, the user's profile for the system/platform extends beyond basic biometrics to IoT device registration and AI pattern analysis.

The system/platform is configured/programmed to learn the Bluetooth, MAC and network devices (IoT devices) that are present with each subsequent validation to learn what the client carries. It also learns the locations frequently visited and the devices at those locations. The system/platform retained images can be preferably fragmented, encrypted and stored in diverse locations, and preferably will only re-assemble if their smart programming recognizes the authority of the requestor, including the requestor's IoT signature, which can be considered intelligent data as a service.

The system/platform regularly retrains its knowledge base when (a) a client validates on the system/platform's network; (2) at intervals when the network is underutilized; (3) new clients join the KNWN network; and/or (4) IoT date is received via the API.

Thus, the platform/system and method augment biometric security, geometrically speed up biometric authentication, perfect the security of biometric authentication, allow pre-fetch of biometric data based on IoT data, and use holographic IoT data to secure biometric authentication.

The pre-fetch allows the system/platform to identify who is approaching a scanner, or who is likely to approach a scanner or to request an authentication and gets ready in advance with their biometric data loaded into local memory to feed to a CNN. Thus, the pre-fetch provides speed and additional accuracy.

Preferably, the biometric matching is performed by one or mole servers (the cloud). The workload can be distributed on virtualized servers anywhere. Speeds down to $1/8^{th}$ of a second including the round trip using parallel computing in the cloud have been accomplished with the system/platform in view of the pre-fetch. The pre-fetch figures out what comes next and gets ready for it, thus reducing time needed. In one non-limiting example, the system/platform expect a user's biometric request when it sees one of the user's devices or recognize one of his patterns. Preferably, the system/platform and method are not dependent on devices, but instead are preferably device neutral.

The electronic platform/system and method uses electronic data to protect itself by realizing where an individual's device is and where it is being accessed from. As the internet expands into the physical world, with every device being IP enabled and addressable, the geographic proximity, network proximity, proximity to the access point of the internet, the authentication, encryption and presentation and flow of data can be linked to an increasingly addressable and measurable physical reality, a moment in time and a proximity to other data and objects using the system and method. The data itself is IP accessible in the form of IP addressable storage devices, and subject to the same techniques. Geographic, chronological and addressable interrelationship of the data as it is packetized and distributed, and the devices as they communicate, form a fabric. In total, a holographic layer of authorization, encryption, and distribution of data can be created by spanning the fabric of IP addressable objects and data. As the number of types of these devices proliferate, it becomes geometrically more complex to replicate the local fabric. A unique encryption key, access method, authentication method, and data distribution framework is disclosed. This unique key can further be utilized to subset biometric identification such that the number of biometric signatures to be compared may be minimized, potentially down to one, thereby geometrically speeding up biometric identification while perfecting its security. Accordingly, the programs and data protect themselves by realizing where they are and where they are being accessed from.

Preferably, the pre-fetching/earlier gathering of information, such as biometric data, as for a quicker authentication processing (i.e. decreases processing time) and can be used as a factor, such as a first factor of authentication for security. The pre-fetching/earlier gathering of information can also be used for perfecting the system/platform's biometric training set.

The use of the disclosed system/platform and method is limitless, including, without limitation, to internet, transaction security, online transaction security, access control, etc.

All numbers, values, amounts, dimensions, temperatures, etc. ("Values"), if any, are provided by way of example and not considered limiting, and it is also within the scope of the disclosure to use higher and/or lower Values with the disclosed novel system/platform and method.

Though primary discussed in connection with facial biometrics, it should also be recognized that the disclosed platform/system and method is not limited to use with facial biometrics and the disclosed platform/system and method can be used with various types of biometrics and all are considered within the scope of the disclosure.

It should be understood that the exemplary embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from their spirit and scope.

All components of the described system and their locations, electronic communication methods between the system components, electronic storage mechanisms, etc. discussed above or shown in the drawings, if any, are merely by way of example and are not considered limiting and other component(s) and their locations, electronic communication methods, electronic storage mechanisms, etc. can be chosen and used and all are considered within the scope of the disclosure. It is also recognized that many of the processes and digital steps performed by the disclosed system and method may be achieved through various types of digital technology, including without limitation, physical servers, virtual services, cloud based technology, etc.

Unless feature(s), part(s), component(s), characteristic(s) or function(s) described in the specification or shown in the drawings for a claim element, claim step or claim term specifically appear in the claim with the claim element, claim step or claim term, then the inventor does not consider such feature(s), part(s), component(s), characteristic(s) or function(s) to be included for the claim element, claim step or claim term in the claim when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

The benefits, advantages, solutions to problems, and any element(s) that may cause any benefit, advantage, or solution to occur or become more pronounced are not to be construed as a critical, required, or essential features or elements of any or all the claims.

While the disclosure has been described in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. A software-based method for identifying an electronic network access point associated with an electronic device of an individual where the electronic device is attempting to store or access data, comprising the following steps:
   (a) identifying one or more physical electronic devices associated with the electronic device of the individual that are communicating on the network access point;
   (b) forming a holographic map of interconnected data between the individual's electronic device and the one or more electronic devices identified in the step (a); and
   (c) identifying a unique location within a physical world, an IoT or Internet based on the holographic map formed in the step (b);
   wherein the electronic network access point associated with the electronic device of the individual is identified when the electronic device is the attempting to store or access data.

2. The software-based method of claim 1 wherein the identifying in the step (a) is accomplished by identifying conversations between the individual's electronic device and the one or more electronic devices sniffed across the network access point.

3. The software-based method of claim 1, further comprising the step (b) of forming the holographic map as part of an identity authentication process for the individual.

4. The software-based method of claim 3 wherein the identity authentication process also includes one or more of the following protections: biometrics, physical protections and manually entered passwords.

5. The software-based method of claim 1 further comprising a step of leveraging the holographic map for encryption to form a basis of unique digital keys.

6. The software-based method of claim 1 wherein the unique location identified in the step (c) represents a specific location in time and space that cannot be replicated without having all of the one or more physical electronic devices placed and communicating in an exact geometry as when identified in the step (a).

7. The software-based method of claim 1 further comprising a step of determining by an electronic system how many times each of the physical electronic devices identified in the step (a) has been previously electronically seen by the electronic system in connection with the individual.

8. The software-based method of claim 7 for the electronic devices previously seen on multiple occasions by the electronic system; electronically attributing the previously seen electronic devices as the electronic devices closely associated with the individual by the electronic system.

9. A software-based method for earlier gathering of electronic data pertaining to an individual to be applied in identifying or authenticating the individual for a transaction or other electronic activity in order to decrease the processing time required for identifying or authenticating the individual in connection with the transaction or other electronic activity, comprising the following steps of:
   (a) receiving the electronic data from Internet of Things ("IoT") devices associated with the individual via an application programming interface of an electronic system;
   (b) determining by the electronic system whether any of the IoT devices have previously communicated with or sent the electronic data to the electronic system in connection with the individual; and
   (c) where the electronic system determines in the step (b) that one or more IoT devices has previously communicated or sent the electronic data in connection with the individual, automatically electronically prefetching previously saved biometric history data for the individual such that the previously saved biometric history data is available earlier in connection with electronically identifying or authenticating the individual by the electronic system for the transaction or other electronic activity;
   further comprising steps of determining how many times any IoT device associated with the individual from step (a) had been previously electronically seen by the electronic system and determining a total score based on how many of the IoT devices were associated with the individual in the step (a) and how many times the IoT devices were previously seen by the electronic system;
   further comprising step of parsing a number of the IoT devices associated with the individual and a number of previous electronic seen by the electronic system of the IoT devices by a learning neural network;
   wherein the electronic data pertaining to the individual to be applied in identifying or authenticating the individual for the transaction or other electronic activity is gathered earlier in order to decrease the processing time required for identifying or authenticating the individual in connection with the transaction or other electronic activity.

10. The software-based method of claim 9 wherein the step (b) further comprises comparing a received IoT device data to previously saved the electronic data for the electronic devices previously seen by the electronic system for the individual in predicting future actions by the individual.

11. The software-based method of claim 9 further comprising a step of determining an authentication or an identification confidence level for the individual by the electronic system based on the electronic data of the IoT device.

12. A software-based method for earlier gathering of electronic data pertaining to an individual to be applied in identifying or authenticating the individual for a transaction or other electronic activity in order to decrease a processing time required for identifying or authenticating the individual in connection with the transaction or other electronic activity, comprising the following steps of:
(a) receiving the electronic data from Internet of Things ("IoT") devices associated with the individual via an application programming interface of an electronic system;
(b) determining by the electronic system whether any of the IoT devices have previously communicated with or sent the electronic data to the electronic system in connection with the individual; and
(c) where the electronic system determines in the step (b) that the one or more IoT devices has previously communicated or sent the electronic data in connection with the individual, automatically electronically prefetching previously saved biometric history data for the individual such that the previously saved biometric history data is available earlier in connection with electronically identifying or authenticating the individual by the electronic system for the transaction or other electronic activity;
further comprising a step of applying an IoT data and the prefetched biometric data to reduce a number of profiles that the electronic system has to search or compare for authenticating or identifying the individual for the transaction or other electronic activity;
wherein the electronic data pertaining to the individual to be applied in identifying or authenticating the individual for the transaction or other electronic activity is gathered earlier in order to decrease the processing time required for identifying or authenticating the individual in connection with the transaction or other electronic activity.

13. The software-based method of claim 12 wherein the step (b) further comprises comparing the received IoT devices electronic data to previously saved the electronic data for electronic devices previously seen by the electronic system for the individual for use in predicting future actions by the individual.

14. A software-based method for earlier gathering of electronic data pertaining to an individual to be used for identifying or authenticating the individual for a transaction or other activity in order to decrease a processing time required for identifying or authenticating the individual, comprising the following steps of:
(a) receiving the electronic data from Internet of Things ("IoT") devices associated with the individual by an electronic system;
(b) electronically saving the electronic data and any biometric data for the individual;
(c) based on prior conduct of the individual known to the electronic system obtained from the electronic data saved in the step (b), determining by the electronic system an anticipated future point in time that the individual will be at a physical or virtual location; and
(d) automatically electronically prefetching the biometric data saved in step (b) prior to the anticipated future point in time such that the biometric data is already gathered or retrieved for use in electronically identifying or authenticating the individual at the physical or virtual location in connection with a transaction or other activity involving the individual;
further comprising a step of applying the electronic data and the prefetched biometric data to reduce a number of profiles that the electronic system has to search or compare for authenticating or identifying the individual for the transaction or other activity;
wherein electronic data pertaining to the individual to be used for identifying or authenticating the individual for the transaction or other activity is gathered earlier in order to decrease the processing time required for identifying or authenticating the individual.

15. The software-based method of claim 14 further comprising the step (c) of determining by the electronic system whether any of the IoT devices have previously communicated with or sent the electronic data to the electronic system in connection with the individual and applying any data or information of prior communication between the any of the IoT devices and the electronic system in connection with the determinations made in the step (c).

16. The software-based method of claim 14 wherein the step (c) further comprises comparing saved history for the IoT devices associated with the individual and returning a confidence metric.

17. The software-based method of claim 14 further comprising a step of comparing current received biometric data for an individual at the physical or virtual location with the biometric data prefetched in step (d).

* * * * *